US006655138B2

(12) United States Patent
Shaw et al.

(10) Patent No.: US 6,655,138 B2
(45) Date of Patent: Dec. 2, 2003

(54) SYSTEM AND METHOD FOR ACTUATING AND CONTROLLING A TRANSFER CASE

(75) Inventors: Schuyler S. Shaw, Dayton, OH (US); John B. Hageman, Vandalia, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/135,578

(22) Filed: Apr. 30, 2002

(65) Prior Publication Data

US 2002/0162328 A1 Nov. 7, 2002

Related U.S. Application Data

(60) Provisional application No. 60/287,915, filed on May 1, 2001.

(51) Int. Cl.[7] ............................................... F16D 31/02
(52) U.S. Cl. ........................ 60/545; 91/433; 192/85 R
(58) Field of Search ..................... 91/433; 192/85 R; 60/422, 460, 461, 466, 545

(56) References Cited

U.S. PATENT DOCUMENTS 5,035,312 A * 7/1991 Asayama et al. ............. 91/433
6,341,552 B1 * 1/2002 Potter et al. ................. 91/433

* cited by examiner

Primary Examiner—Edward K. Look
Assistant Examiner—Thomas E. Lazo
(74) Attorney, Agent, or Firm—Scott A. McBain

(57) ABSTRACT

One aspect of the control system provides a hydraulic control system for a transfer case that includes an actuator for generating fluid pressure. The system also includes an isolation valve and a control valve in fluid communication with the actuator. The isolation valve is in a normally closed position and the control valve is in a normally open position. The system further includes a piston for applying fluid pressure to a device of the transfer case. Another aspect provides a method for controlling the hydraulic pressure to a transfer case.

19 Claims, 3 Drawing Sheets

SYSTEM AND METHOD FOR ACTUATING AND CONTROLLING A TRANSFER CASE

RELATED APPLICATION

This application claims the benefit of U.S. Provisional Application No. 60/287,915, filed May 1, 2001, entitled System and Method for Actuating and Controlling a Vehicle Drivetrain Transfer Case by Schuyler S. Shaw and John B. Hageman.

TECHNICAL FIELD

The present invention relates generally to transfer cases for use in four-wheel drive vehicles. More particularly, the present invention relates to a system to provide a clutch pack slip control mode and range selector shift function to a transfer case clutch and range selector.

BACKGROUND OF THE INVENTION

The drivetrain in many light-duty and sport-utility vehicles includes a transfer case for transmitting drive torque for the engine and transmission to all four of the wheels, thereby establishing a four-wheel-drive mode of operation. To accommodate differing road surfaces and conditions, many transfer cases are equipped with a gear reduction unit that can be selectively shifted by the vehicle operator to establish four-wheel high range and low range drive modes.

In addition, current control of transfer case clutch packs allows high slip conditions to occur. After a short period, approximately 10 seconds, the motor actuator locks up the clutch pack using a brake to prevent the motor and clutch pack from overheating. At full lock, speed differential on the clutch pack is zero, thereby generating no heat. This mode of operation is not always appropriate in certain situations.

It would be desirable to provide an electrohydraulic actuator system for a drivetrain transfer case that overcomes these and other disadvantages

SUMMARY OF THE INVENTION

The object of this invention is directed to an improved control system and actuator for a transfer case. More particularly, this invention is directed to an electrohydraulic actuator and control system for a transfer case.

One aspect of the present invention provides an electrohydraulic control system for a vehicle drivetrain transfer case that includes an actuator for generating fluid pressure. The system also includes an isolation valve and a control valve in fluid communication with the actuator and a clutch pack. The isolation valve is in a normally closed position and the control valve is in a normally open position. The system further includes a piston for applying fluid pressure to the clutch pack of the transfer case.

Another aspect of the invention provides a hydraulic control system for a vehicle drivetrain transfer case that includes an actuator for generating fluid pressure. The system also includes a first piston for applying fluid pressure to a first device, a selector piston for applying fluid pressure to a second device, and a shuttle valve positioned between the actuator and the second piston. The shuttle valve is in fluid communication with the actuator via a first and a second selector fluid line and in fluid communication with the second piston via a second and a third fluid line.

The invention further provides a method of generating hydraulic pressure for a vehicle drivetrain transfer case that includes generating fluid pressure, applying the fluid pressure to at least one piston, and controlling the fluid pressure to the at least one piston.

Yet another aspect of the invention provides a system for a vehicle drivetrain transfer case comprising means for generating fluid pressure, means for isolating an at least one device from the pressurized fluid, means for applying fluid pressure to the at least one device, means for controlling the pressurized fluid, and means for sensing fluid pressure.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
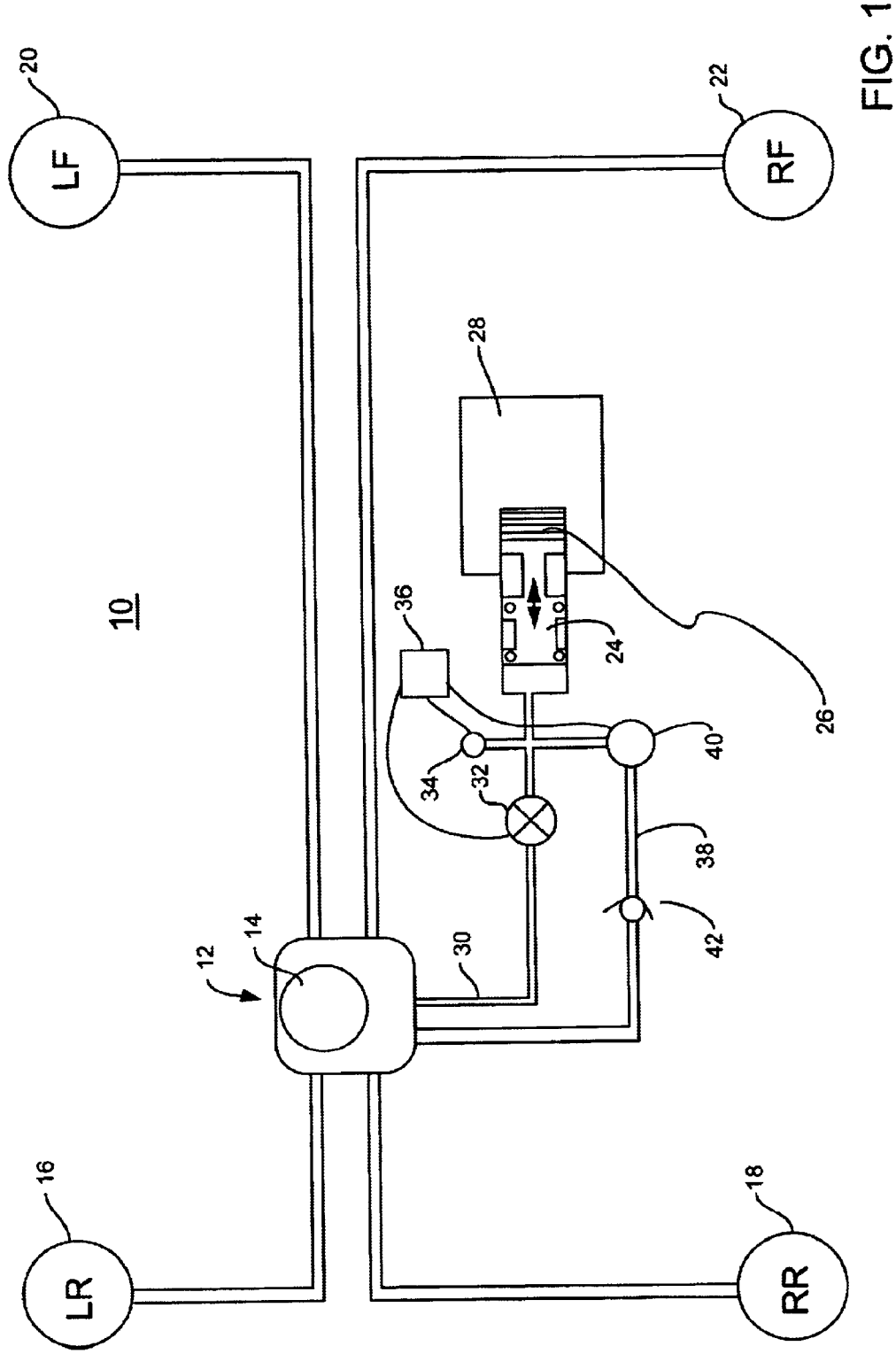
FIG. 1 is a schematic illustration of one embodiment of the drivetrain actuator system of the present invention.

Referring to FIG. 1, a vehicle hydraulic control and drivetrain actuator system incorporating the present invention is illustrated and generally designated by the reference numeral 10. The system includes an actuator 12. The function of actuator 12 is to provide and control a pressurized brake fluid supply to remote brake cylinders associated with wheel assemblies 16, 18, 20 and 22. In one embodiment, actuator 12 may be an antilock brake system (ABS) modulator. The actuator 12 typically includes, or has associated therewith, a pump or like source of pressurized fluid 14.

The modulator 12, as an element of the control and drivetrain actuator system of this embodiment of the present invention, also provides pressurized fluid to a piston 24. Piston 24 is positioned to act on a clutch pack 26 of a transfer case 28. An outlet line 30 of the modulator 12 provides pressurized fluid to an isolation valve 32. The line 30 is an outlet line from the pump 14 of the modulator. Isolation valve 32 is a normally closed valve that isolates clutch pack 26 from the ABS function. The isolation valve 32 at rest prohibits flow-through of fluid to piston 24 of clutch pack 26. When opened, for example by a solenoid, valve 32 allows pressurized fluid to act on piston 24. The opening and modulation of the isolation valve 32 can be performed in response to a demand or control signal from control device 36.

Between valve 32 and piston 24, a pressure sensor 34 can be provided. The pressure sensor 34 senses the pressure in the output fluid line between the valve 32 and the piston 24. The sensor 34 can provide a pressure signal to a control device 36 that operates to control functions of system 10 as described above and explained more fully below.

Piston 24 is positioned to act against the torque management clutch pack 26 in such a manner as to increase the contact friction between the plates of the clutch pack. In other words, an increase of the fluid pressure acting on the piston 24 causes a linear movement of the piston against the clutch pack 26. The compression of the clutch pack 26 increases the transfer of torque therethrough.

An inlet fluid line 38 extends from the piston to the pump 14. A normally open valve 40 is positioned along the inlet line. The normally open valve 40 is maintained in an open condition at rest permitting flow through of fluid. Closing valve 40 permits buildup of fluid pressure at piston 24. The closing and modulation of the valve 40 can be performed in response to a demand or control signal from control device 36.

A check valve 42 may be provided between the valve 40 and the modulator 12. The check valve 42 operates to prohibit backflow of fluid in inlet line 38 toward piston 24.

In one embodiment, fluid pressure to piston 24 is gradually applied by fully opening isolation valve 32 and gradually closing valve 40. Pressure to piston 24 may then be increased, decreased or maintained by the opening or closing of valve 40. In another embodiment, fluid pressure to piston 24 may be gradually applied by closing valve 40 and gradually opening isolation valve 32.

Figure 2:
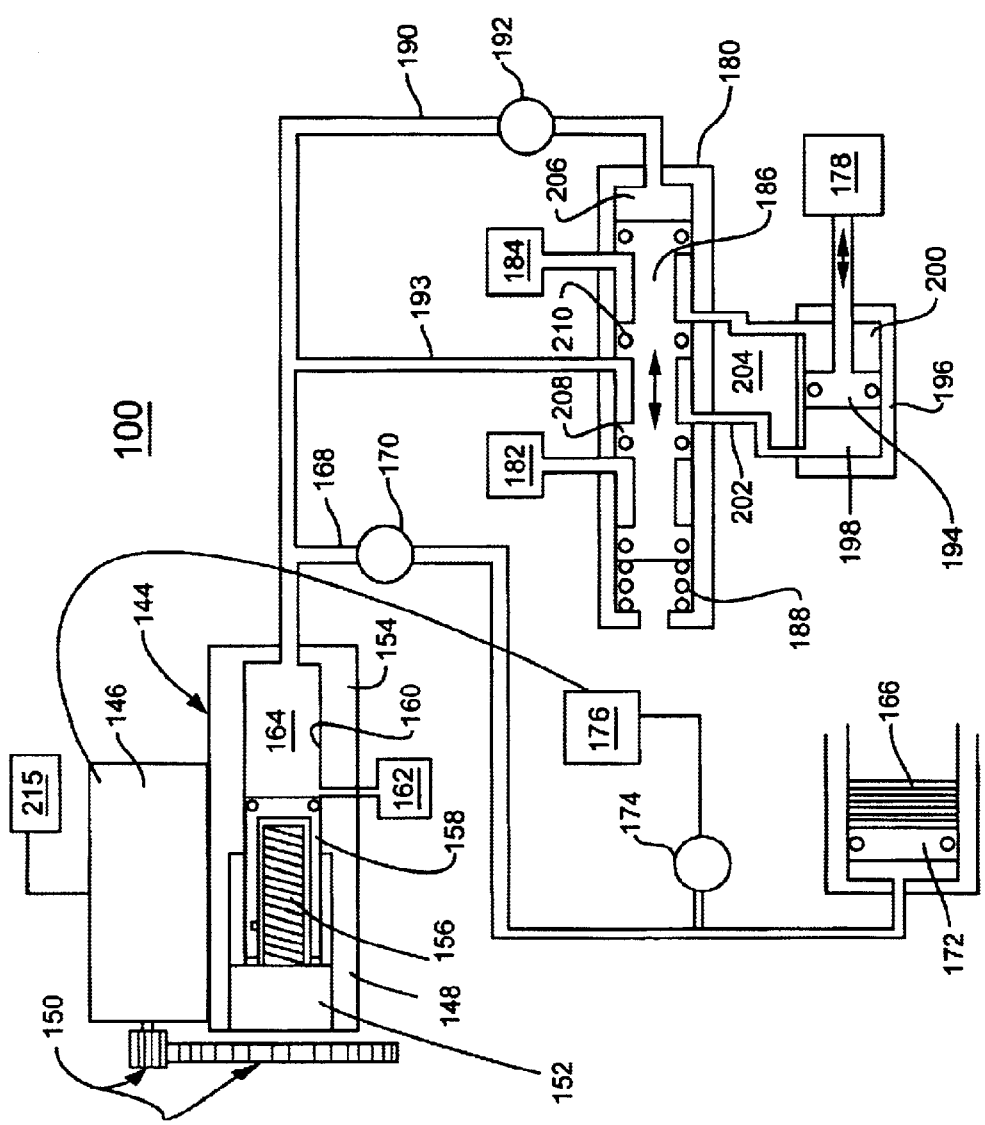
FIG. 2 is a schematic illustration of another embodiment of the drivetrain actuator system of the present invention.

Referring now to FIG. 2, a vehicle hydraulic control and drivetrain actuator system incorporating the present invention is illustrated and generally designated by the reference numeral 100.

The system includes a source of pressurized fluid 144. Pressurized fluid is generated by an actuator 144, which can include electric motor 146. Motor 146 can be a DC motor. The electric motor can be coupled to a ball screw 148 by a transmission 150. The transmission 150 may be any suitable arrangement of intermeshed gears, belt driven pulleys and the like. It will be understood by one with skill in the art that any suitable mechanism can be used to transfer power from the motor 146, including direct connection with the ball screw and further including belts, toothed belts, sprockets, pulleys, chain, chain belts, gears and the like.

The ball or nut portion 152 of the ball screw 148 can be held in housing 154 to prohibit rotation of the nut. The screw portion 156 of the ball screw 148 is operably connected to a piston 158, which is slidably disposed in a bore 160 of the housing 154. A reservoir 162 provides hydraulic fluid, (oil or the like) to chamber 164 of actuator 144. Chamber 164 is formed by piston 158 and bore 160. Movement of the piston 158 in the bore 160 provides pressurized fluid to the system 100.

System 100 may also include a mode selector 215 operably connected to motor 146. Mode selector 215 may send a signal to motor 146 to generate pressurized fluid in response to a signal sent to mode selector 215 by a vehicle operator (not shown) choosing to engage or disengage the range selector 178.

In the illustrated embodiment, pressurized fluid from actuator 144 can be provided to one or more devices. It will also be understood that actuator 144, in other embodiments of the present invention, can be other devices well known in the art for providing pressurized fluid, for example, an ABS modulator, as described above and further described below in relation to FIG. 3.

A first device can be a clutch pack 166 of a vehicle transfer case. The actuator 144 provides pressurized fluid via outlet line 168 through a normally open valve or solenoid 170. The pressurized fluid acts on piston 172 to compress the torque management clutch pack 166 and thereby transfer torque therethrough.

A pressure sensor 174 can be provided between valve 170 and piston 172. The pressure sensor 174 senses the pressure in the output line 168 between the valve 170 and the piston 172. The sensor 174 may then provide a pressure signal to a control device 176. Control device 176 then operates to control functions of system 100 through a connection to motor 146. The amount of pressure that acts on piston 172 may be controlled by varying the pressure generated by actuator 144. In this manner, the fluid pressure to piston 172 may be infinitely varied.

A second device included with system 100 may be a transfer case range selector 178. The range selector typically operates to provide a low and high range of operating gearing for the vehicle. Pressurized fluid from the actuator 144 can be provided to a shuttle valve 180 to provide directional flow to the selector 178.

The shuttle valve 180 can be in fluid communication with a first and second fluid reservoir 182, 184. A piston 186 is slidably disposed in the housing of the shuttle valve 180. A spring 188 is positioned within the shuttle valve 180 to bias the piston 186 in a first direction, (to the right with respect to the illustration).

A first selector line 190 provides pressurized fluid from the actuator 144 to the shuttle valve 180. The first selector line 190 can include a normally open valve or solenoid 192. When the valve 192 is open, and actuator 144 provides pressurized fluid to the shuttle valve 180, the piston 186 of the shuttle valve is moved to a first position (as shown in FIG. 2) overcoming the bias of the spring 188.

A second selector line 193 can be provided in parallel fluid communication with first line 190 between actuator 144 and shuttle valve 180.

Pressurized fluid from the shuttle valve 180 is provided to a selector piston 194. Selector piston 194 is slidably disposed within housing 196 defining left and right chambers 198, 200. Left and right chambers 198, 200 are in fluid communication with shuttle valve 180 by left and right fluid lines 202, 204. Selector piston 194 is operably connected to range selector 178.

In operation, when valve 192 is maintained in the open position fluid pressure in lines 190 and 193 are substantially equal. As shown in the illustration, fluid pressure within shuttle valve first chamber 206 moves piston 186 to a left position in valve 180. Pressurized fluid in line 193 is then allowed to move through valve 180 out through left line 202 into left chamber 198. Due to the build-up of fluid pressure in left chamber 198, piston 194 is urged toward the right with respect to the illustration. At this time, fluid in chamber 200 is forced through right fluid line 204 and valve 180 into reservoir 184.

When the vehicle operator wishes to switch the range selector 178 mode to low a signal may be sent to motor 146 via mode selector 215 to retract piston 158. The decrease in fluid pressure causes piston 186 to be urged toward the right by spring 188. Movement of piston 186 to the right forces fluid to flow from chamber 206 passed valve 192 and into reservoir 162. The movement of piston 186 cause piston seals 208, 210 to move past fluid lines 202, 204.

Once piston 186 has moved to the right, valve 192 is closed. Closing valve 192 allows pressurized fluid to flow through line 193. Pressurized fluid in line 193 is then directed through right line 204 into chamber 200. Due to the increase of fluid in chamber 200, piston 194 is urged in the left direction. The fluid in chamber 198 can then flow past valve 180 into reservoir 182. In this manner, reciprocation of the piston 194 actuates the transfer case range selector 178.

In one embodiment, valve 170 may be closed during the actuation of range selector 178 to isolate clutch pack 166.

Clutch pack 166 maybe isolated so that the actuation of range selector 178 does not affect the operation of clutch pack 166.

Figure 3:
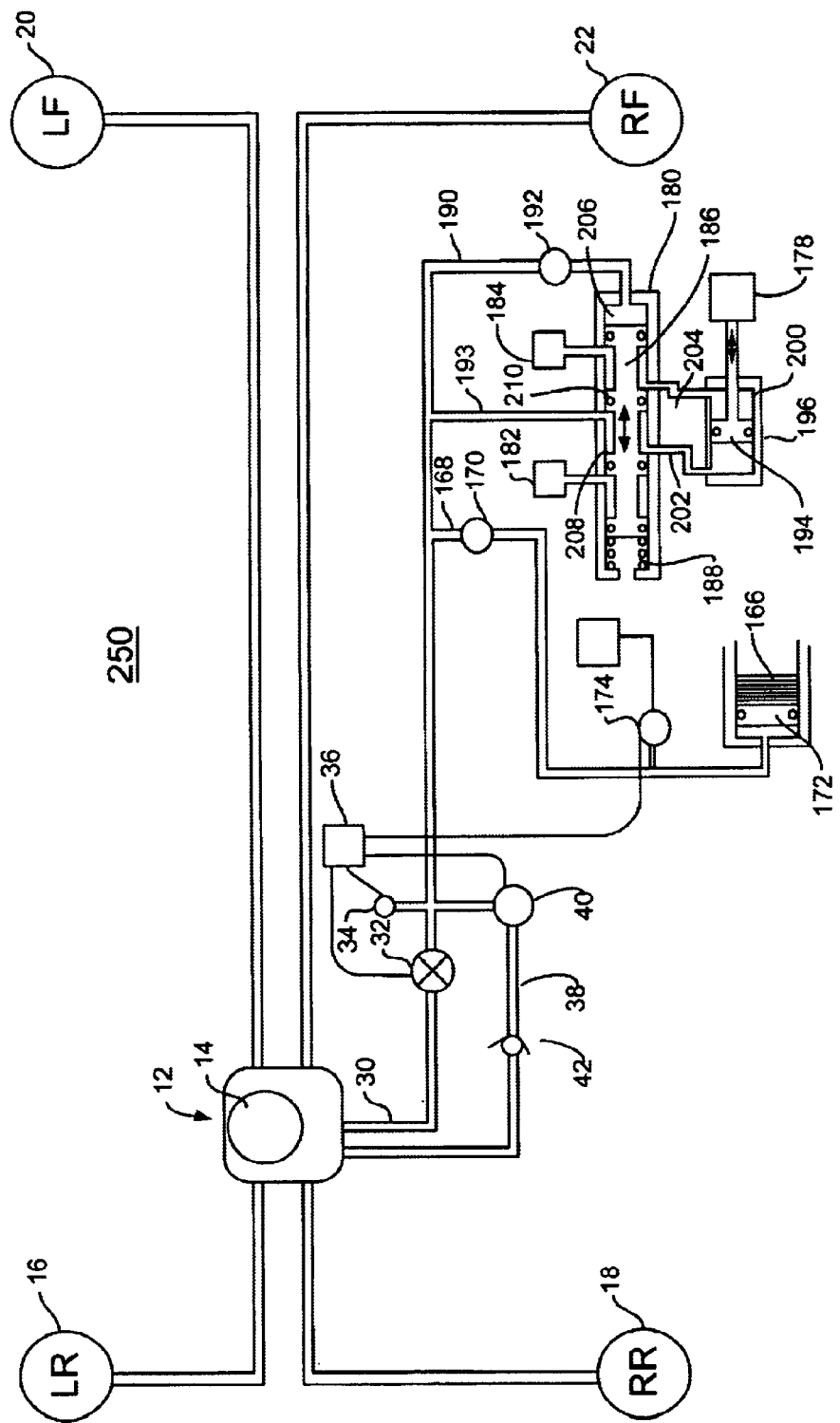
FIG. 3 is a schematic illustration of another embodiment of the drivetrain actuator system of the present invention.

Referring now to FIG. 3, where like elements have like reference numbers as those of FIGS. 1 and 2, a vehicle hydraulic control and drivetrain actuator system incorporating the present invention is illustrated and generally designated by the reference numeral 250.

The system includes an actuator 12. The function of actuator 12 is to provide and control a pressurized brake fluid supply to remote brake cylinders associated with wheel assemblies 16, 18, 20 and 22. In one embodiment, actuator 12 may be an antilock brake system (ABS) modulator. The actuator 12 typically includes, or has associated therewith, a pump or like source of pressurized fluid 14.

In the illustrated embodiment, pressurized fluid from actuator 12 can also be provided to one or more devices.

A first device can be clutch pack 166 of a vehicle transfer case. The actuator 12, provides pressurized fluid to a piston 172. Piston 172 is positioned to act on clutch pack 166 of a transfer case. An outlet line 30 of the actuator 12 provides pressurized fluid to an isolation valve 32. The line 30 is an outlet line from the pump 14 of the actuator 12. Isolation valve 32 is a normally closed valve that isolates clutch pack 166 from the ABS function. The isolation valve 32 at rest prohibits flow-through of fluid to piston 172 of clutch pack 166. When opened, for example by a solenoid, valve 32 allows pressurized fluid to act on piston 172 through fluid line 168. The opening and modulation of the isolation valve 32 can be performed in response to a demand or control signal from control device 36.

Between valve 32 and piston 172, a pressure sensor 174 can be provided. The pressure sensor 174 senses the pressure in the fluid line 168 between the valve 32 and the piston 172. The sensor 174 can provide a pressure signal to a control device 36 that operates to control functions of system 250.

Piston 172 is positioned to act against the torque management clutch pack 166 in the same manner as described above for clutch pack 26 of FIG. 1.

An inlet fluid line 38 extends from the piston to the pump 14. A normally open valve 40 is positioned along the inlet line. The normally open valve 40 is maintained in an open condition at rest permitting flow through of fluid. Closing valve 40 permits buildup of fluid pressure at piston 172. . . The closing and modulation of the valve 40 can be performed in response to a demand or control signal from control device 36.

A check valve 42 may be provided between the valve 40 and the modulator 12. The check valve 42 operates to prohibit backflow of fluid in inlet line 38 toward piston 172.

In one embodiment, fluid pressure to piston 172 is gradually applied by fully opening isolation valve 32 and gradually closing valve 40. Pressure to piston 172 may then be increased, decreased or maintained by the opening or closing of valve 40. In another embodiment, fluid pressure to piston 172 may be gradually applied by closing valve 40 and gradually opening isolation valve 32.

A second device included with system 250 may be a transfer case range selector 178. Pressurized fluid from the actuator 12 can be provided to a shuttle valve 180 to provide directional flow to range selector 178. Flow of pressurized fluid is provided to range selector 178 in the same manner as fluid to clutch pack 166 by fully opening isolation valve 32 and gradually closing valve 40.

Between valve 32 and shuttle valve 180, a pressure sensor 34 can be provided. The pressure sensor 34 senses the pressure in the fluid line 196 between the valve 32 and the shuttle valve 180. The sensor 34 can provide a pressure signal to a control device 36 that operates to control functions of system 250.

The shuttle valve 180 can be in fluid communication with a first and second fluid reservoir 182, 184. A piston 186 is slidably disposed in the housing of the shuttle valve 180. A spring 188 is positioned within the shuttle valve 180 to bias the piston 186 in a first direction, (to the right with respect to the illustration).

A first selector line 190 provides pressurized fluid from the actuator 12 to the shuttle valve 180. The first selector line 190 can include a normally open valve or solenoid 192. When the valve 192 is open, and actuator 12 provides pressurized fluid to the shuttle valve 180, the piston 186 of the shuttle valve is moved to a first position (as shown in FIG. 3) overcoming the bias of the spring 188.

A second selector line 193 can be provided in parallel fluid communication with first line 190 between actuator 12 and shuttle valve 180.

Pressurized fluid from the shuttle valve 180 is provided to a selector piston 194. Selector piston 194 is slidably disposed within housing 196 defining left and right chambers 198, 200. Left and right chambers 198, 200 are in fluid communication with shuttle valve 180 by left and right fluid lines 202, 204. Selector piston 194 is operably connected to range selector 178.

In operation, when valve 192 is maintained in the open position fluid pressure in lines 190 and 193 are substantially equal. As shown in the illustration, fluid pressure within shuttle valve first chamber 206 moves piston 186 to a left position in valve 180. Pressurized fluid in line 193 is then allowed to move through valve 180 out through left line 202 into left chamber 198. Due to the build-up of fluid pressure in left chamber 198, piston 194 is urged toward the right with respect to the illustration. At this time, fluid in chamber 200 is forced through right fluid line 204 and valve 180 into reservoir 184.

When the vehicle operator wishes to switch the range selector 178 mode to low, a signal may be sent from control device 36 to isolation valve 32 to close valve 32 and open valve 40. The decrease in fluid pressure causes piston 186 to be urged toward the right by spring 188. Movement of piston 186 to the right forces fluid to flow from chamber 206 passed valve 192 and into pump 14 via inlet line 38. The movement of piston 186 cause piston seals 208, 210 to move past fluid lines 202, 204.

Once piston 186 has moved to the right, a signal may be sent to close valve 192, open valve 32 and close valve 40. Closing valve 192 allows pressurized fluid to flow through line 193. Pressurized fluid in line 193 is then directed through right line 204 into chamber 200. Due to the increase of fluid in chamber 200, piston 194 is urged in the left direction. The fluid in chamber 198 can then flow past valve 180 into reservoir 182. In this manner, reciprocation of the piston 194 actuates the transfer case range selector 178.

In one embodiment, valve 170 may be closed during the actuation of range selector 178 to isolate clutch pack 166. Clutch pack 166 may be isolated so that the actuation of range selector 178 does not affect the operation of clutch pack 166.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A hydraulic control system for a transfer case comprising:
    an actuator for generating fluid pressure;
    a clutch pack;
    an isolation valve in fluid communication with the actuator via an outlet fluid line and the clutch pack, wherein the isolation valve is normally in a closed position;
    a control valve in fluid communication with the actuator via an inlet fluid line and the clutch pack, wherein the control valve is normally in an open position; and
    a first piston for applying fluid pressure to the clutch pack, the first piston positioned in fluid communication between the isolation valve and the control valve.

2. The system of claim 1 further comprising:
    a fluid pressure sensor; and
    a control device, wherein the fluid pressure sensor provides a pressure signal to the control device and wherein the control device is operably connected to the isolation valve and the control valve.

3. The system of claim 1 further comprising:
    a check valve positioned between the control valve and the actuator along the inlet fluid line.

4. The system of claim 1 wherein the actuator comprises an antilock brake system modulator including a pwnp for generating the fluid pressure.

5. The system of claim 1 further comprising:
    a first solenoid positioned between the isolation valve and the clutch pack and wherein the first solenoid may be closed to maintain a fluid pressure to the clutch pack;
    a first fluid pressure sensor positioned between the first solenoid and the clutch pack; and
    a control device wherein the first fluid pressure sensor provides a pressure signal to the control device and wherein the control device is operably connected to the isolation valve and the control valve.

6. The system of claim 5 further comprising:
    a selector piston for applying fluid pressure to a second device in fluid communication with the actuator;
    a shuttle valve positioned between and in fluid communication with the actuator and the second device, wherein the shuttle valve is in fluid communication with the actuator via a first selector fluid line and a second selector fluid line; and
    a second solenoid positioned along the first selector fluid line wherein closing the second solenoid stops fluid flow to the shuttle valve via the first selector fluid line.

7. The system of claim 6 wherein the second device comprises a range selector.

8. The system of claim 6 wherein the actuator comprises an antilock brake system modulator including a pump for generating the fluid pressure.

9. A hydraulic control system for a transfer case comprising:
    an actuator for generating fluid pressure;
    a first piston for applying fluid pressure to a first device, the piston in fluid communication with the actuator via a first fluid line;
    a selector piston for applying fluid pressure to a second device, the selector piston in fluid communication with the actuator; and
    a shuttle valve positioned between the actuator and the selector piston,
    wherein the shuttle valve is in fluid communication with the actuator via a first and a second selector fluid line and is in fluid communication with the selector piston via a second and a third fluid line.

10. The system of claim 9 further comprising:
    a fluid pressure sensor positioned along the first fluid line between the first piston and the actuator; and
    a control device, wherein the fluid pressure sensor provides a pressure signal to the control device and wherein the control device is operably connected to the actuator.

11. The system of claim 10 further comprising:
    a first solenoid positioned along the first fluid line between the actuator and the fluid pressure sensor.

12. The system of claim 11 further comprising:
    a second solenoid positioned along the first selector fluid line between the shuttle valve and the actuator wherein closing the second solenoid stops fluid flow to the shuffle valve via the first selector fluid line.

13. The system of claim 11 wherein the actuator comprises:
    a motor;
    a ball screw held in a housing and coupled to the motor by a transmission;
    a piston operably connected to a screw portion of the ball screw, the piston slidably disposed in a bore of the housing;
    a chamber formed by the piston and the bore; and
    a reservoir connected to the chamber to provide hydraulic fluid to the chamber,
    wherein movement of the piston generates pressurized fluid.

14. A method of generating hydraulic pressure for a transfer case comprising:
    generating fluid pressure;
    applying the fluid pressure to an at least one piston positioned between an isolation valve and a control valve; and
    controlling the fluid pressure to the at least one piston.

15. The method of claim 14 wherein controlling the fluid pressure to the at least one piston comprises opening the isolation valve and closing the control valve.

16. The method of claim 15 wherein controlling the fluid pressure further comprises providing a pressure signal obtained from a fluid pressure sensor to a control device operably connected to the isolation valve and the control valve.

17. The method of claim 14 wherein generating fluid pressure comprises actuating a motor driven ball screw contained in a housing, the housing defining a fluid chamber in fluid communication with the at least one piston and wherein activating the ball screw generates the fluid pressure.

18. The method of claim 17 wherein controlling the fluid pressure to the at least one piston comprises modulating the fluid pressure by advancing or retracting the ball screw.

19. A hydraulic control system for a transfer case comprising:
    means for generating fluid pressure;
    means for isolating an at least one device flow the pressurized fluid;
    means for applying fluid pressure to the at least one device;
    means for controlling the pressurized fluid; and
    means for sensing fluid pressure,
    wherein the at least one device is positioned between the means for isolating an at least one device and the means for controlling the pressurized fluid.

* * * * *